COANDA EFFECT SWITCH FOR HANDLING AND CONVEYING WORKPIECES ON A LAYER OF FLUID

Filed Jan. 3, 1969

3 Sheets-Sheet 1

INVENTOR
W. K. MAMMEL

BY R. P. Miller
ATTORNEY 3,721,472

COANDA EFFECT SWITCH FOR HANDLING AND CONVEYING WORKPIECES ON A LAYER OF FLUID

Walter Kester Mammel, Yardley, Pa., assignor to Western Electric Company, Incorporated, New York, N.Y.

Continuation-in-part of application Ser. No. 607,793, Jan. 6, 1967. This application Jan. 3, 1969, Ser. No. 801,903
Int. Cl. B65g 53/04
U.S. Cl. 302—31 20 Claims

ABSTRACT OF THE DISCLOSURE

A method and device utilizes the Coanda effect of a fluid flowing use of an aperture and over an adjacent step to manipulate a workpiece, such as a slice of semiconductor material, relative to an aerodynamic conveyor or a pickup head.

CROSS REFERENCES TO RELATED APPLICATIONS

This application is a continuation-in-part of applicant's copending patent application, Ser. No. 607,793, filed Jan. 6, 1967, now abandoned. In the aforementioned application there was reference to another copending application entitled, "Pressurized Fluid Pickup Device," Ser. No. 485,751, filed Sept. 8, 1965, now Pat. No. 3,466,079, wherein an apparatus for handling slices of material on a layer of fluid is disclosed. In another copending application, now U.S. Pat. 3,431,009, issued Mar. 4, 1969, Ser. No. 607,792 filed the same date as the original application, entitled, "Pickup Device for Supporting Workpieces on a Layer of Fluid," a related device is disclosed.

BACKGROUND OF THE INVENTION

In using conventional devices for handling thin slices of semiconductor material, extreme care must be taken to prevent contaminating or breaking the slices and thereby avoid wasting of semiconductor material. For example, in handling thin slices of semiconductor material with pickup devices such as tweezers, every time the device makes contact with the surface of a slice there is the possibility of contaminating and physically damaging the semiconductor material. Repeated handling of the slices with tweezers reduces the number of usable semiconductor devices which can be obtained from each semiconductor slice.

In order to avoid repeated handling operations which result in contamination and breakage of the semiconductor slices, an apparatus which supports the slices on a layer of flowing fluid, for example, air, can be used to handle and convey the slices. In an apparatus of this type, it is desirable to provide facilities which are capable of switching the direction of flow of the fluid layer to change the direction of motion of the slices.

SUMMARY OF THE INVENTION

An object of the present invention is providing a new and improved apparatus and method which utilize the Coanda effect of a flowing fluid to facilitate the handling and transporting of workpieces such as thin slices of semiconductor material.

Another object of the present invention resides in a new and improved method of and apparatus for handling and conveying workpieces, such as thin slices of semiconductor material on a layer of flowing fluid in which Coanda effect forces are utilized to switch the direction of supporting forces impressed on the workpieces.

A further object is providing a conveyor switch which utilizes the Coanda effect of a flowing fluid for changing the direction of motion of a workpiece on an aerodynamic conveyor.

With these and other objects in view, the present invention relates to a method and an apparatus for supporting or transporting workpieces, such as thin slices of semiconductor material on a layer of fluid flowing over a stepped surface in accordance with Coanda effect forces. In a first embodiment of the invention, a thin slice of semiconductor material is supported on a stream of air emerging from an aperture or slot formed in a planar surface. A movable step adjacent to the aperture can be raised or lowered relative to the planar surface to produce Coanda forces on the stream of air which determine the direction of flow of the air across the planar surface. By raising or lowering the step, a slice positioned over the slot can be moved laterally over the planar surface as desired. This embodiment may find use in either a pickup device or a conveyer.

In a second embodiment, when it is desired to move the slice along a predetermined path (e.g. on a conveyor) or to support the slice in a predetermined fixed position (e.g. by a pick-up device), a stationary step may be employed at desired locations to produce the necessary Coanda effect forces on the fluid in a desired and predetermined direction.

BRIEF DESCRIPTION OF THE DRAWING

Other objects and advantages of the present invention will become aparent upon consideration of the following description in conjunction with the acompanying figures, wherein:

In FIGS. 1 and 2, there is shown an aerodynamic conveyor including a base unit 20 which is used to move a workpiece 21, such as a thin slice of semiconductor material, along its conveying surface 22. The base unit 20 includes a rectangular hollow body 23 having a baffle 28 positioned therein to divide the interior of the body 23 into two chambers. A pair of plates 24 and 25 are connected to the upper portion of the body 23. The plates 24 and 25 are positioned such that their top surfaces are in the same plane to form the conveying surface 22, and are spaced apart to form a narrow elongated aperture or slot 26 along the center of the conveying surface 22. Within the slot 26 there are a plurality of vanes 27 (FIG. 2) which are positioned at a predetermined angle from the vertical. The interior walls of the hollow rectangular body 23 together with the lower surfaces of the plates 24 and 25 and one wall of the baffle 28 form a first chamber to which a pressurized fluid is applied by a source 29. The source 29 is connected by a flexible hose through a valve $V_1$ to a coupling 30 which communicates with the chamber. When the pressurized fluid, such as air, is applied to the chamber, an angularly directed flow of fluid issues from the slot 26 between the vanes 27 to support and convey the workpiece 21 over the conveying surface 22. A pair of guide rails 31 are mounted upon the plates 24 and 25 to guide the workpiece 21 in a straight line as it moves along the conveying surface 22.

As shown in FIGS. 1 and 2, a rectangular member 32 is pivotally mounted to the plate 25 and an end plate 25' by a pair of pivot pins 33. An inner edge of the member 32 is positioned adjacent to the edge of an extended section of the plate 24 to form a switching slot 26' which is an extension of the slot 26. The lower surfaces of the member 32, the end plate 25', and extended section of plate 24 together with the interior walls of the body 23 and a second wall of the baffle 28 form a second chamber to which pressurized fluid is applied by the source 29. The source 29 is connected by a flexible hose through a valve $V_2$ to a coupling 30' which communicates with the second chamber. Pressurized fluid applied to this chamber issues from the slot 26'.

Figure 1:
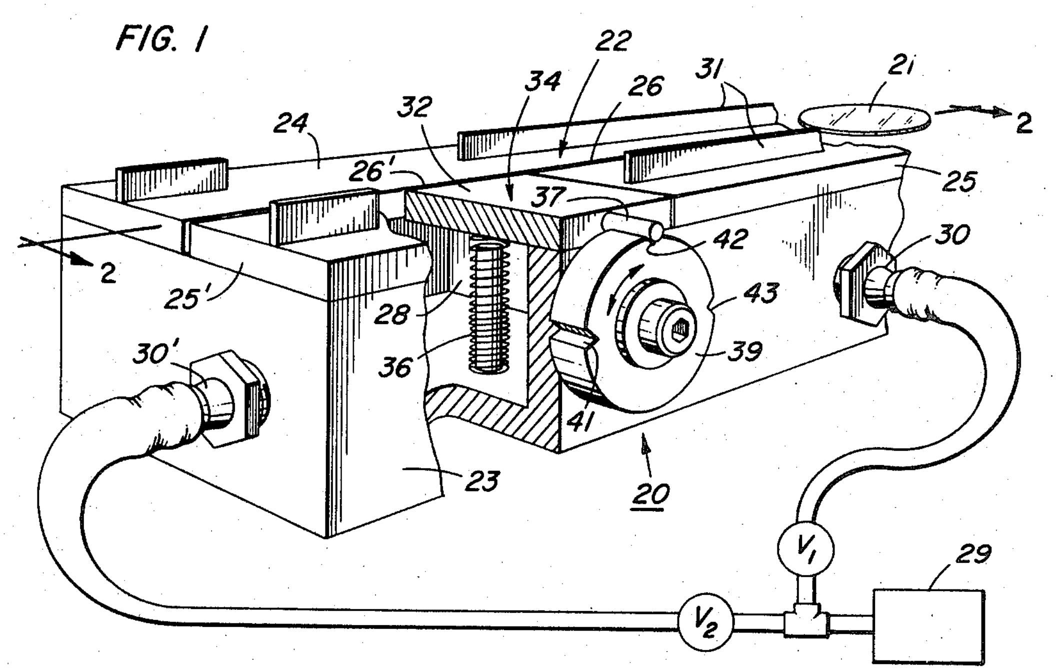
FIG. 1 is a fragmentary, partially cut away perspective view of an aerodynamic conveyor having a fluid switch utilizing Coanda effect forces in accordance with the principles of the invention.
Figure 2:
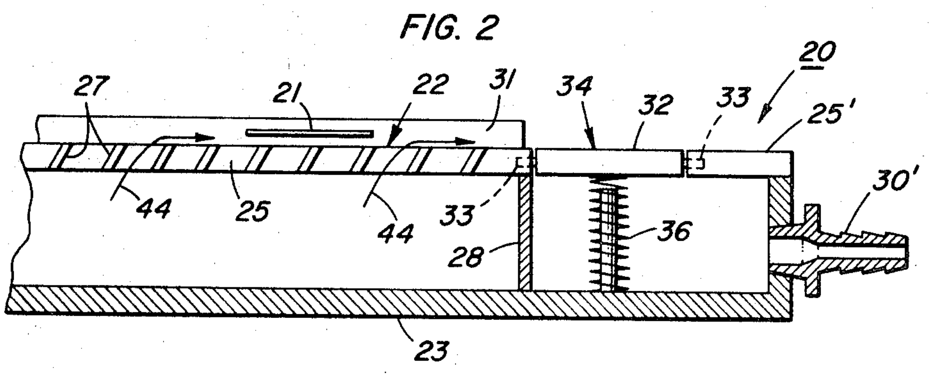
FIG. 2 is a sectional view taken generally along line 2—2 of FIG. 1 showing a plurality of vanes for directing fluid through a slot to move a workpiece toward the switch.
Figure 3:
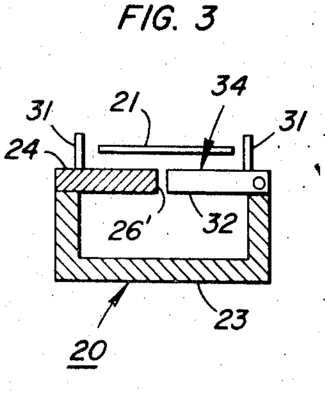
FIG. 3 is a cross-sectional view of the conveyor showing the switch in its unoperated position, allowing the workpiece to move in a straight line along the conveyor.
Figure 4:
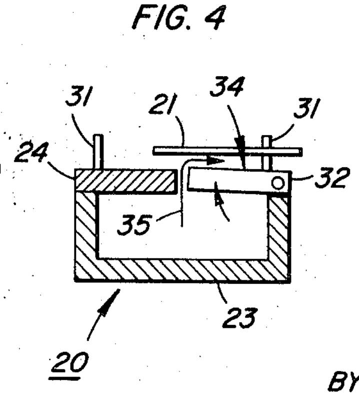
FIGS. 4 and 5 are cross-sectional views of the conveyor showing the relative positions of the switch operated to apply Coanda effect forces to a fluid stream to switch the direction of motion of a workpiece passing over the switch.
Figure 5:
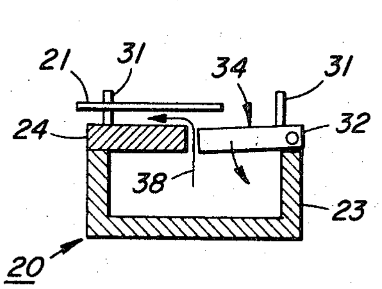

The top surface 34 of the member 32 may move relative to the planar conveying surface 22 when the member 32 is pivoted about the pins 33 (FIG. 2). The surface 34 can be raised or lowered relative to the conveying surface 22 to produce a step contiguous to the switching slot 26' (FIGS. 4 and 5). A compression spring 36, mounted within the second chamber and bearing against the underside of the member 32, urges the member 32 in an upward direction. An actuator pin 37, extending from the opposite edge of the member 32, is biased against the periphery of a control wheel 39 by the spring 36. The wheel 39 has three notches 41, 42, and 43 of different depths formed on its periphery which are used to control the position of the member 32. When the wheel 39 is positioned so that the pin 37 rests in the notch 42 (FIG. 1), the top surface 34 of the member 32 and the conveying surface 22 form a continuous planar surface as shown in FIG. 3 and no step (FIGS. 4 and 5) is produced. If the wheel 39 is turned so that the pin 37 rests in the notch 41, the member 32 is pivoted such that its surface 34 is elevated from the conveying surface 22 and forms the raised surface of a step at the slot 26' as shown in FIG. 4. The inner edge of the member 32 adjacent to the switching slot 26' forms the riser surface of the step. And if the wheel 39 is turned so that the pin 37 rests in the notch 43, the step is formed in the opposite direction (FIG. 5). In this instance, the top surface 34 forms the depressed surface of the step and the edge of the section 24 forms the riser surface.

In the operation of the method and apparatus of the present invention, pressurized fluid is applied to the chambers of the base unit 20 through the couplings 30 and 30' and a stream of fluid emerges from the elongated slot 26 and the switching slot 26'. The valves $V_1$ and $V_2$ control the pressure of the fluid applied to each chamber. When a workpiece 21, such as a thin slice of semiconductor material is positioned over the slot 26, the flow of fluid from the slot 26 between the vanes 27 is deflected about the lower surface of the workpiece 21 and forms a layer of fluid which supports the workpiece 21 above the conveying surface 22. In accordance with Bernoulli's theorem, the static pressure on the lower surface of the workpiece 21 is less than the static presure on its upper surface. The resulting pressure differential applies a downward force on the workpiece 21 which maintains it in an equilibrium position above the conveying surface 22 upon a layer of flowing fluid. The angular vanes 27 impart a horizontal movement to the air resulting in a force component on the workpiece 21 (indicated by arrows 44 of FIG. 2) which propels the workpiece 21 horizontally along the conveying surface 22 between the guide rails 31.

When the workpiece 21 reaches the switching slot 26' of the conveyor, it can be routed in any of three directions by appropriate positioning of the member 32. If the workpiece 21 is to continue its motion in a straight line along the conveying surface 22, then the member 32 is positioned by rotating the wheel 39 until the pin 37 rests in the notch 42, so that the surface 34 of the member 32 and the conveying surface 22 form a continuous planar surface as shown in FIG. 3. With the member 32 in this position, the momentum of workpiece 21 moving along the elongated slot 26 carries the workpiece 21 across the switching slot 26' without changing its direction of motion.

If it is desired to move the workpiece 21 leftward or rightward of the switching slot 26', then the member 32 is pivoted to form a step adjacent to the slot 26'. As shown in FIG. 4, when the member 32 is pivoted to form a step with its raised surface to the right, then a greater part of the air (indicated by arrow 35) emerging from the slot 26' tends to flow by a Coanda effect over the raised surface of the step, i.e., to the right over the surface 34, and the slice 21 is moved rightward from the slot 26'. Similarly, when the member 32 is pivoted to form a step in the opposite direction, as shown in FIG. 5, a greater part of the air (indicated by arrow 38) tends to flow by a Coanda effect across the conveying surface 22 to the left, over the top surface of the plate 24, and the workpiece 21 is moved leftward from the slot 26'. It should be noted that in both cases, a greater part of the fluid is directed over the raised surface of the step, i.e., the surface which is nearer to the workpiece.

The flow pattern over the conveying surface 22 in the switching area of the conveyor results from Coanda effect forces applied to the fluid flowing through the switching slot 26'. Briefly, the Coanda effect can be described as the tendency of a flowing fluid to adhere to a surface that is near an opening from which the fluid emerges. In the present invention, Coanda effect forces applied to the fluid stream by the riser surface of the step result in an increased amount of air flow over the raised surface of the step formed at the switching slot 26'. By switching the direction of the step, the direction of the air flow over the conveying surface 22 can be switched and a workpiece 21 positioned over the switching slot 26' can be moved to the right or left as desired.

In considering the operation of the apparatus and method of the present invention, it should be noted that the relationship between the dimensions of the switching slot 26' and the height of the step determines the amount of fluid which flows over the raised surface and the depressed surface of the step. As the fluid stream emerges from the switching slot 26' and is deflected by the workpiece 21, two opposing factors influence its flow. First, a portion of the stream of fluid tends to follow the path of least resistance to flow. Since the distance between the depressed surface and the workpiece 21 is larger than the corresponding distance between raised surface and the workpiece 21, the fluid encounters less resistance to flow when it passes over the depressed surface. Therefore, a first portion of a fluid stream emerging from the switching slot 26' is deflected by the workpiece 21 over the depressed surface. Secondly, another portion of the stream of fluid emerging from the switching slot 26' adjacent to the riser surface of the step is affected by Coanda effect forces exerted by the riser surface. The Coanda forces cause a second portion of the stream of fluid to flow along the riser surface to be deflected by the workpiece 21 over the raised surface. The dimensions of the switching slot 26' and the height of the riser surface determine the relative amounts of fluid affected by the two opposing factors and the resulting fluid flow pattern over the workpiece 21.

Figures 6, 7:
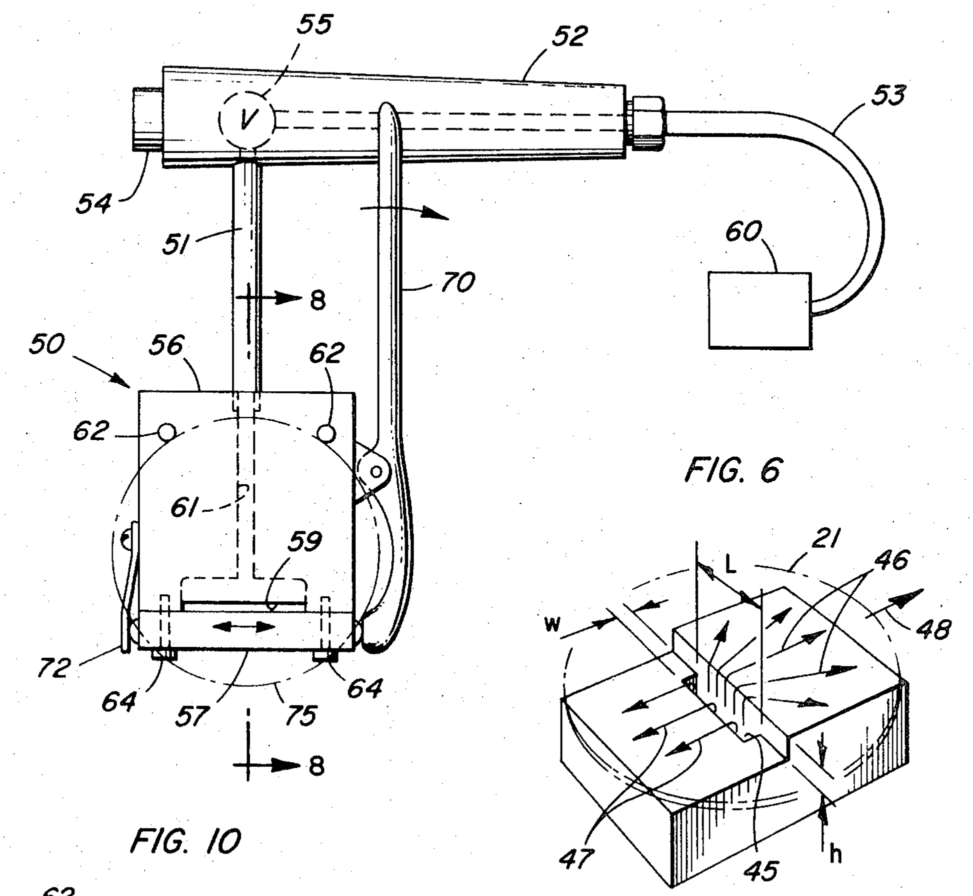
FIG 6. illustrates the fluid flow pattern obtained from a rectangular aperture formed adjacent to a step wherein the Coanda forces acting on the fluid control its flow.
FIG. 7 illustrates a pickup device having an aperture on its working face through which a stream of pressurized air is driven to support a slice-like workpiece at a distance from its facea nd a movable step adjacent to the aperture for applying Coanda forces to the airstream.

If, as shown in FIG. 6, an aperture 45 is in the form of a slot having length L and width $w$, and a riser surface of height $h$ is formed adjacent to the aperture 45, then the dimensions L, $w$, and $h$ can be selected such that the portion of the fluid stream affected by Coanda forces is relatively large. For example, if the length L is approximately .75 inch and the width $w$ is 1.5 mils and the height $h$ is 4 mils, then a large portion of the fluid emerges adjacent to the riser surface and is affected by Coanda forces. As a result, the portion of fluid deflected by a workpiece 21 over the raised surface of the step (indicated by arrows 46) is greater than the portion deflected over the depressed surface (indicated by the arrows 47). The difference in flow produces a lateral force 48 on the workpiece 21 which moves it over the raised surface.

By increasing the width $w$ of the aperture 45, the relative effect of the Coanda forces on the fluid stream emerging from the aperture 45 is diminished. If the width $w$ is made sufficiently large, then the Coanda forces are not controlling and a greater portion of the fluid stream follows the path of least resistance and is deflected over the depressed surface. By varying the height $h$ of the riser surface, the relative effect of the Coanda forces is also affected. For example, if the height $h$ is decreased to a value of 1 mil, then the effect of the Coanda forces on the fluid stream is substantially diminished. In this instance, the fluid tends to flow equally over the depressed and raised surfaces since they constitute a substantially continuous planar surface. If, on the other hand, the height $h$ is increased to a relatively large value such that the distance between the depressed surface and the workpiece is very large relative to the distance between the raised surface and the workpiece, then the influence of the depressed surface on the fluid flow pattern adjacent to the workpiece 21 is negligible. In this case, the fluid stream flowing along the riser surface blows the workpiece 21 away from the raised surface.

In the present invention, the length and width of the switching slot 26' and the height of the riser surface are chosen such that the portion of the fluid affected by Coanda forces is relatively large. As a result, a greater portion of the fluid flows over the raised surface of the step thereby exerting a lateral force on the workpiece 21 in the direction of the raised surface. Applicant's copending application entitled, "Pickup Device for Supporting Workpieces on a Layer of Fluid," filed the same date as the instant application, discloses an apparatus for handling a workpiece on a layer of fluid in which the tendency of the fluid to follow the path of least resistance is used to overcome Coanda effect forces acting on the fluid.

It should be noted that in the operation of the conveyor, it is not necessary that the base unit 20 be divided into two chambers. The baffle 28 can be removed from the base unit 20 without destroying the operativeness of the conveyor and switch. In this instance, a fluid at a uniform pressure is applied to both the conveying slot 26 and the switching slot 26'. It has been found, however, that the effectiveness of the switch is increased by operating the switching slot 26' at a higher pressure than the conveying slot 26. For example, a base unit 20 having a switching slot width of 7 mils and a conveying slot width of 7 mils, a switching slot length of 1½ inches, and a step height of 8 mils can be used to convey and switch semiconductor slices approximately 1¼ inches in diameter and 5 mils in thickness by applying pressurized air at 0.1 p.s.i. to the conveying slot 26 and at 0.2 p.s.i. to the switching slot 26'. The pressure of the air applied to the slots 26 and 26' can be varied by operating the valves $V_1$ and $V_2$ in order to determine the most effective combination of pressures for any workpiece.

The present invention can be utilized in an aerodynamic conveying system where it is desired to convey workpieces such as thin slices of semiconductor material with a minimum amount of contact with the conveyor. For example, the switching device illustrated in FIG. 1 can be used at the intersection of two conveyors to switch the direction of motion of workpieces which are advanced to the intersection. In a conveying system where slices of material are supported on a layer of flowing fluid, contact between the slices and the conveyor is eliminated and the possibilities of contaminating and breaking the slices are accordingly reduced.

FIG. 7 illustrates a slice pickup device incorporating the switching principle of the present invention. A pickup head 50 is connected by a hollow stem 51 to a handle 52 which contains a valve 55. The handle 52 is connected at one end to a source 60 of pressurized fluid, for example air, by a hose 53. A push button 54, extending from the other end of the handle 52, operates the valve 55 which controls the supply of pressurized fluid to pickup head 50.

The pickup head 50 consists of two rectangular members 56 and 57 which are assembled to form a narrow rectangular aperture or slot 59 on its working face. The upper member 56 contains a passageway 61, shown in FIGS. 8 and 9, connecting the stem 51 to the aperture 59. A pair of locating pins 62 are mounted on the face of the upper section 56.

Figure 10:
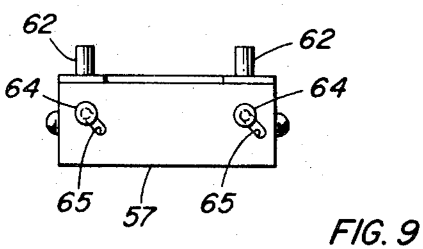
FIG. 10 illustrates facilities by which the lower step section shown in FIG. 9 is shiftably connected to the pickup head.

The lower section 57 is shiftably mounted to the upper member 56 by a pair of stud bolts 64 (FIGS. 7 and 10). The member 57 contains a pair of angled slots 65 (FIG. 10) through which the bolts 64 are fitted to the upper section 56. A step 67 (FIGS. 8 and 9) can be formed at the orifice 59 by sliding the lower member 57 along the bolts 64. A lever 70 which is pivotally mounted to the upper section 56 is used to shift the position of the lower section 57. A leaf spring 72 biases the section 57 against the lever 70.

Figure 8:
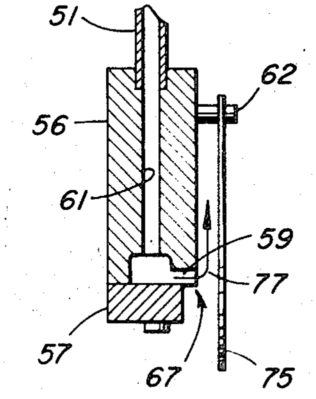
FIG. 8 is a partial side view taken on line 8—8 of FIG. 7, illustrating the use of Coanda effect forces to support a workpiece adjacent to the working face of the pickup.

In operating the pickup device, the pickup head 50 is positioned so that its working face is adjacent to the surface of the workpiece, in this instance a thin slice 75 of material. The slice 75 may be in either a horizontal or vertical position. Then the push button 54 is depressed to open the valve 55 within the handle 52 which allows pressurized air to flow through the stem 51 and the passageway 61 and emerge as an air stream from the aperture 59. If the rectangular sections 56 and 57 are arranged as shown in FIG. 8, with the lower section 57 shifted to the left to form a step 67, then the air emerging from the aperture 59 is deflected by the slice 75 and tends to flow over the surface of the upper section 56, illustrated by arrow 77, thereby exerting a frictional force on the slice 75 which propels it against the locating pins 62. This flow of air across the working face of the pickup head 50 results from Coanda effect forces exerted by the step 67 on the airstream. At the same time, in accordance with Bernoulli's theorem, there is a static pressure differential developed across the slice 75 which acts to move the slice 75 toward the working face of the pickup head 50 until an equilibrium position is reached. The slice 75 remains suspended on a layer of fluid away from the working face of the pickup head 50 and held against the locating pins 62 so long as the push button 54 is depressed. The action of the Coanda effect forces on the airstream and the locating pins bring the slice to a precise location on the pickup device. Succeeding slices handled by the pickup device are also brought to this position. Since only two locating pins are involved, workpieces of different diameters and dimensions may be handled readily by the pickup device.

Figure 9:
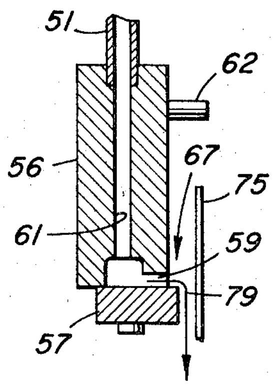
FIG. 9 is a view similar to FIG. 8 showing the pickup head after its lower step section has been shifted to reverse the direction of the Coanda effect forces.

By shifting the lower section 57 to the right to reverse the step 67 as shown in FIG. 9, the direction of flow of air across the working face of the pickup head 50 due to the Coanda effect is reversed, as illustrated by arrow 79, and the slice is propelled in the opposite direction. Thus, by shifting the position of the lower section 57, the pickup head 50 can be used to load and unload thin slices of semiconductor material on the slice pickup apparatus.

As indicated above, the pickup device may be used to pick up workpieces in either the vertical (FIGS. 7–9) or horizontal positions (not illustrated). When the slice 75 is in the horizontal position, for example, lying upon a horizontal surface, the locating pins 62 are caused to touch the horizontal surface near the edge of the slice. When air issues from aperture 59, the slice is lifted toward the pickup device and as the result of Coanda effect forces moved against the locating pins by the airstream.

The handling of horizontally oriented workpieces may be facilitated by bending stem 51 (FIG. 7) so that the working face of the device from which locating pins 62 project is offset from handle 52. In FIG. 7, this would result in the working face being moved nearer to the observer.

The slice pickup device of FIGS. 1 and 7 can be used to handle and transport thin slices of semiconductor material without the contamination and breakage which results from handling the slices with conventional devices, such as tweezers. Since the slices are supported away from the surface of the apparatus on a layer of fluid, the difficulties resulting from contact between the surfaces of the slices and the apparatus are eliminated.

Figure 11:
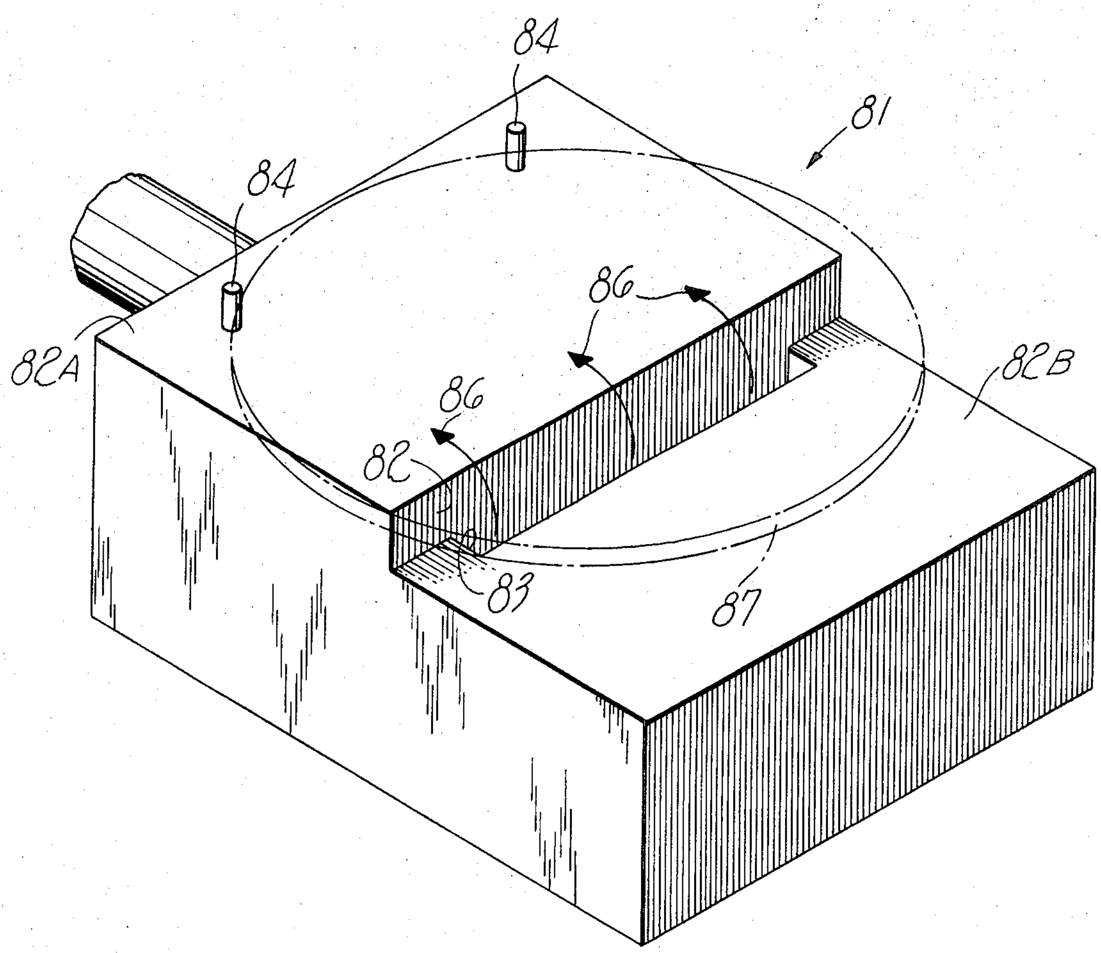
FIG. 11 is a pictorial view illustrating a modification of the pickup device shown in FIG. 7 wherein the step is stationary.

FIG. 11 illustrates a further embodiment of a pickup device which employs the principle of Coanda forces to pickup and convey a workpiece. Similar in design to the pickup illustrated in FIG. 6, the device 81 (FIG. 11) has a fixed step 82 formed on one planar surface thereof (hereafter termed working face) which comprises a protruding portion 82A and a depressed portion 82B. An orifice 83 is formed in the depressed region 82B of the working face 82 adjacent the protruding portion and substantially along the length thereof. Affixed to the working face of the protruding portion are two projecting stop pins 84—84 spaced apart in juxtaposition to each other and parallel to the length of the orifice 83. Means (not shown) are provided for supplying pressurized fluid, such as air, to the orifice 83 so that the fluid emerging from the orifice travels over the protruding portion 82A in a direction towards the projecting stop pins 84—84 as indicated by the arrows 86—86. The flow of the pressurized fluid upward and over the protruding portion of the step is generated by Coanda forces, as explained previously.

In operation, the device 81 is positioned over a workpiece such as a wafer slice 87 in much the same manner as that outlined in FIG. 7. As soon as pressurized fluid emerges from the orifice 83 and travels over the protruding step 82A the slice 87 is drawn toward the working face by Bernoulli forces. The tendency of the slice 87 to slide across the working face in the direction of the travel of the fluid is limited by the projecting stop pins 84—84 which limit the lateral movement of the slice. Thus the slice is held in position on the working face 82 of the pickup device. Release of the slice 87 from the workpiece 81 can be accomplished by terminating the flow of fluid from the orifice 83.

It is to be understood that a conveyor track, such as that shown in FIG. 1, having one or more fixed steps 82 situated in desired locations on the face of the conveyor could be used in lieu of the pickup device 81 to convey the wafer slice 87. Upstanding sidewalls can be employed on the sides of the working face of the conveyor in lieu of the projecting stop pins 84—84 to limit the movement of the wafer 87 during the conveyance thereof.

As discussed above, the fluid issuing from the elongated slots of the conveyor base unit (FIGS. 1–5) and the apertures of the pickup heads (FIGS. 7–11) has been used to convey, switch motion, and otherwise handle workpieces. The fluid may also be used to treat the workpieces, if desired. For example, the fluid may be employed to clean the workpieces or to provide a protective atmosphere for the workpieces as they are handled.

What is claimed is:

1. In an apparatus for supporting a workpiece on a layer of fluid:

means for applying a stream of pressurized fluid against a surface of a workpiece;

means cooperating with said pressurized fluid applying means for applying sufficient Coanda effect forces to said stream of fluid to direct a greater part of said fluid in a desired direction to move said workpiece in that direction; and means for engaging the wrokpiece to limit its movement in said direction.

2. An apparatus for supporting a workpiece on a layer of fluid comprising:

a body member having a planar reference surface and a passageway formed therethrough which terminates in an orifice in said planar reference surface;

means for applying pressurized fluid through said passageway to the surface of a workpiece to form a layer of fluid between the workpiece and said planar reference surface on which the workpiece is supported away from said reference surface;

means for engaging the workpiece to limit movement thereof so that the workpiece may be supported in a predetermined position; and a step located on one side of and adjacent to said orifice for applying sufficient Coanda effect forces to the fluid emerging therefrom to direct a greater portion of the fluid in a direction away from said orifice and over said step to move the supported workpiece in that direction and against said engaging means.

3. The apparatus as set forth in claim 2 wherein said step is in fixed relationship with said planar reference member.

4. The apparatus as set forth in claim 2 wherein said step is in perpendicularly adjustable relationship with said planar reference member.

5. In a workpiece manipulator, a body member having:

(a) a step formed in one generally planar surface thereof, said step comprising a protruded portion and a depressed portion, (b) an orifice formed in said depressed portion adjacent said protruded portion, said orifice being so related to said protruded portion that a fluid emerging from said orifice travels over said protruded portion in a selected direction due to Coanda forces;

at least one member affixed to said protruded portion opposite said orifice and adapted to engage a workpiece to limit movement thereof over said protruded portion; and means for applying pressurized fluid to said orifice so that said fluid emerging from said orifice travels over said protruded portion toward said engaging member to generate Bernoulli forces between the surface of said protruded portion and said workpiece adjacent thereto to maintain said workpiece adjacent said protruded portion on a thin layer of said fluid, said workpiece being engaged by said engaging member.

6. The apparatus as set forth in claim 5 wherein said engaging member includes a stop surface which prevents movement of said workpiece away from said protruded portion.

7. The apparatus as set forth in claim 5 wherein said engaging member includes a guideway which directs said workpiece away from said protruded portion.

8. Apparatus for manipulating workpieces with a fluid, comprising:

(A) a body member having both a generally planar surface and a passageway therethrough which terminates in an orifice at said surface;

(B) means for applying the fluid to said passageway;

(C) a step in said surface adjacent said orifice, said step and said orifice being so related that (1) said fluid issuing from said orifice travels up and over said step due to Coanda forces, and (2) said fluid travelling over said step, both (a) retains a workpiece positioned near thereto on a thin layer of the fluid due to Bernoulli forces, and (b) moves said retained workpiece in the direction of said fluid travel due to frictional forces; and (D) means for engaging said retained and moved workpiece for limiting movement thereof.

9. In an apparatus for supporting and switching workpieces on a layer of fluid:

a first member and a second member having surfaces in the same plane and spaced apart to provide an elongated slot therebetween;

means for applying pressurized fluid through said elongated slot to the surface of a workpiece to produce a layer of flowing fluid between said workpiece and said member surfaces to support said workpiece away from said member surfaces; and means for moving one of said members relative to the other member to move its surface out of said plane into a stepped relationship with the surface of the other of said members to apply sufficient Coanda effect forces to the fluid flowing through said elongated slot to direct a greater part of said fluid over the member surface nearer to said workpiece to switch said workpiece over that surface away from said slot.

10. In a transporting device for an article having a planar surface;

a first member having a planar surface;

a second member movable along an edge of said first member and having a planar surface;

said members having an opening extending therebetween terminating at said surfaces of said members;

means for impressing pressurized fluid through said opening against a planar surface of an article to deflect said fluid into a stream of fluid over said planar surfaces of said first and second members at a reduced pressure that holds and supports said article spaced from said surfaces; and means for moving one of said surfaces relative to the other to switch the fluid emerging from said slot to flow along one of said planar surfaces and impart a lateral fluid force component to said article in a direction over that planar surface.

11. In a transporting device as set forth in claim 10:

means for limiting movement of said article across said surfaces by said lateral force component.

12. In a conveyor for handling workpieces on a layer of fluid:

a base unit having a conveying surface over which a workpiece is propelled and an elongated slot in said conveying surface;

means for applying pressurized fluid through said slot to said conveying surface to form a layer of fluid along which said workpiece is propelled over said conveying surface;

a step member contiguous to said slot movably mounted on said base unit to be raised or lowered relative to said conveying surface for applying Coanda effect forces to said fluid emerging from said slot, and means for raising or lowering said step member to apply sufficient Coanda effect forces to said fluid to direct a greater part of said fluid in a first direction over the raised step member of in a second direction over said conveying surface to switch the direction of movement of a workpiece propelled over said slot.

13. In an aerodynamic conveyor for transporting slices of material:

a base unit having a planar conveying surface and an elongated slot centrally disposed along said planar conveying surface;

means projecting from said base unit for guiding a slice along said conveying surface;

means for driving pressurized air through said elongated slot to impinge a stream of air upon said slice to support and convey said slice at a distance above and along said planar conveying surface;

a switching means including a step member contiguous to said slot and movably mounted to said base unit having a surface parallel to said conveying surface to be raised or lowered relative to said planar conveying surface for applying Coanda effect forces to said stream of air; and means for raising and lowering said step member to apply sufficient Coanda effect forces to said stream of air to direct a greater part of said stream of air in a predetermined direction from said slot to move said slice in that predetermined direction.

14. In an aerodynamic conveyor for selectively moving a slice of material therealong:

a base unit having a first member and a second member having surfaces in the same plane and being spaced apart to provide an elongated slot therebetween, said first member projecting beyond said second member in said plane to provide an extension member;

a section member having an edge spaced from said extension member to provide a switching slot which is a continuation of said elongated slot;

means for movably mounting said section member to said second member such that a top surface thereof can be moved into and relative to the plane surfaces of said first and second members;

means for driving pressurized fluid through said slots to support and advance a slice of material along and above said base member plane surface; and means for selectively moving said section member to move its top surface relative to said base member plane surface for imparting a Coanda effect flow to the fluid emerging from said switching slot to direct a greater part of said fluid over the higher of said extension member surface or said section member top surface to switch the direction of advance of said slice.

15. In an aerodynamic conveyor for selectively moving a slice of material along a layer of flowing fluid:

a base unit having a first member and a second member having top surfaces in the same plane and being spaced apart to provide an elongated slot therebetween, said first member projecting beyond said second member to provide an extension member having its top surface in said plane;

a plurality of vanes positioned within said elongated slot for deflecting pressurized fluid therebetween;

a section member having an edge spaced from said extension member to provide a switching slot which is a continuation of said elongated slot;

means for movably mounting said section member to said second member such that a top surface thereof can be moved into and relative to said plane of said first and second member surfaces;

means for forcing fluid at a first pressure through said elongated slot between said vanes to form a layer of flowing fluid to support and advance a slice of material along and above said base member plane surfaces;

means for forcing fluid at a second pressure through said switching slot to support said slice above said extension member and section member surfaces; and means for selectively moving said section member to move its top surface relative to said base member plane surfaces to apply sufficient Coanda effect forces to the fluid emerging from said switching slot to direct a greater part of said fluid over the higher of said extension member surface or said section member top surface to switch the direction of movement of said slice.

16. In an aerodynamic conveyor for selectively moving a slice of material along a layer of flowing air:
a hollow base unit having a first member and a second member having top surfaces thereof in the same plane and being spaced apart to provide an elongated slot therebetween, said first member projecting beyond said second member to provide an extension member having its top surface in said plane;
a plurality of vanes positioned within said elongated slot for deflecting pressurized air therebetween;
a section member having an edge spaced from said extension member to provide a switching slot which is a continuation of said elongated slot;
means for movably mounting said section member to said second member such that a top surface thereof can be moved into and relative to said plane of said top surfaces of said first and second members;
a baffle positioned within said base unit to divide the interior of said base unit into a first chamber beneath said elongated slot and a second chamber beneath said switching slot;
means for applying air at a first pressure to said first chamber to emerge from said elongated slot deflected by said vanes to form a layer of flowing air to support and advance a slice of material along said slot and above said first and second member surfaces;
means for guiding said slice along said elongated slot and over said member surfaces;
means for applying air at a second pressure to said second chamber to emerge from said switching slot to support said slice above said extension member and extension member surfaces as it is advanced over said switching slot; and
means for selectively moving said section member to move its top surface relative to said top surface of said extension member to apply sufficient Coanda effect forces to the fluid emerging from said switching slot to direct a greater part of said fluid over the higher of said extension member surface or said section member surface to move said slice over the higher surface away from said slot.

17. In a pickup device for supporting workpieces on a layer of fluid:
a body having a planar reference surface and an aperture terminating in said reference surface,
means for conducting pressurized fluid through said aperture to the surface of a workpiece to produce a layer of fluid to support said workpiece adjacent to said reference surface,
a step member movably mounted on said body adjacent to said aperture having a surface substantially parallel to said reference surface which can be displaced from the plane of said reference surface toward or away from said workpiece for applying Coanda effect forces to the fluid emerging from said aperture, and
means for moving said step member surface relative to said reference surface to apply sufficient Coanda effect forces on said fluid to direct a greater portion of said fluid over the surface nearer to said workpiece to move said workpiece over that surface away from said aperture.

18. In a pickup device for supporting workpieces on a stream of fluid:
a body having a planar reference surface and an aperture in said reference surface through which pressurized fluid is passed to form a stream of fluid to support a workpiece at a distance from said reference surface,
a step movably mounted on said body adjacent to said aperture having a surface which can be displaced from said reference surface for applying Coanda effect forces to said stream of fluid to direct its flow across said workpiece,
means for moving said step relative to said reference surface so that one of said surfaces is nearer to said workpiece to apply sufficient Coanda effect forces to said stream to direct a greater part of said stream of fluid and said slice laterally across the surface nearer to said workpiece, and
means projecting from said body for contacting the edge of said workpiece to limit its lateral movement across said reference surface.

19. In a pickup device for handling slices of material:
a pickup head having a planar working face including a first section and a second section;
means for shiftably mounting said second section relative to said first section;
said first section having a passageway terminating in an aperture in said working face adjacent to said second section;
means for driving pressurized air through said passageway and aperture to form a stream of air to support a slice at a distance from said working face;
means for shifting said second section relative to said first section to form a step on said working face adjacent to said aperture, said step exerting Coanda effect forces on said stream of air to direct a greater part of said stream of air and said slice across said working face over the surface of said step nearer to said workpiece; and
means projecting from said first section for contacting the edge of said slice to limit its lateral movement across said working face over said first section.

20. A method of positioning a workpiece relative to a reference surface having an aperture therein and a movable step adjacent to said aperture which comprises:
applying pressurized fluid to the surface of said workpiece through said aperture to produce a layer of flowing fluid between said surface and said workpiece to attract and support said workpiece away from said reference surface; and
moving said step so that its surface is raised or lowered relative to said reference surface to apply Coanda effect forces to said flowing fluid to direct a greater part of said fluid emerging from said aperture over the surface nearer to said workpiece to exert a lateral force on said workpiece to move said workpiece over that surface away from said aperture.

References Cited

UNITED STATES PATENTS

| | | | |
|---|---|---|---|
| 2,052,869 | 9/1936 | Coanda | 239—418 |
| 3,126,200 | 3/1964 | Rehm | 271—26 |
| 3,425,736 | 2/1969 | Benjamin | 294—64 |
| 3,431,009 | 3/1969 | Mammel | 294—64 |
| 3,438,668 | 4/1969 | Olsson et al. | 294—64 |

HARVEY C. HORNSBY, Primary Examiner

U.S. Cl. X.R.

271—26; 294—64

L-566-PT
(6-69)

UNITED STATES PATENT OFFICE
CERTIFICATE OF CORRECTION

Patent No. 3,721,472 Dated March 20, 1973

Inventor(s) WALTER K. MAMMEL

It is certified that error appears in the above-identified patent and that said Letters Patent are hereby corrected as shown below:

In the specification, Column 2, line 29, "aparent" should read --apparent--; line 30, "acompanying" should read --accompanying--; line 56, "facea nd" should read --face and--. Column 6, lines 25 and 26, "mem-mers" should read --mem-bers--.

In the claims, column 8, claim 5, line 43, "manipulator," should read --manipulator:--, same line, "a body" should begin a new paragraph; line 52, "at least" should begin a new paragraph; line 54, "means for" should begin a new paragraph. Column 9, claim 10, line 33, "surface;" should read -- surface:-- .

Signed and sealed this 22nd day of January 1974.

(SEAL)
Attest:

EDWARD M. FLETCHER, JR.
Attesting Officer

RENE D. TEGTMEYER
Acting Commissioner of Patents